United States Patent [19]

Wada et al.

[11] 4,052,739
[45] Oct. 4, 1977

[54] ELECTRONIC ENGRAVING SYSTEM

[75] Inventors: Masanobu Wada, Sendai; Yujiro Koike, Machida; Yoshihisa Okuma, Tokyo, all of Japan

[73] Assignees: Matsushita Electric Industrial Co., Ltd., Osaka; Dai Nippon Printing Company, Ltd., Tokyo, both of Japan

[21] Appl. No.: 653,954

[22] Filed: Jan. 30, 1976

Related U.S. Application Data

[63] Continuation-in-part of Ser. No. 360,050, May 14, 1973, abandoned.

[30] Foreign Application Priority Data

May 19, 1972 Japan ............................ 47-49135

[51] Int. Cl.² .................... H04N 1/28; H04N 5/76
[52] U.S. Cl. ............................................. 358/299
[58] Field of Search ............. 178/6.6 B, 6.6 R, 6.7 R; 179/2 TV; 358/299, 297, 130, 131, 302

[56] References Cited

U.S. PATENT DOCUMENTS

| | | | |
|---|---|---|---|
| 2,092,765 | 9/1937 | Losier | 178/6.6 B |
| 2,925,464 | 2/1960 | Raible | 178/6.6 B |
| 3,061,670 | 10/1962 | Oster | 179/2 TV |
| 3,075,895 | 1/1963 | MacLean | 178/6.6 B |
| 3,181,170 | 4/1965 | Akin | 178/6.6 B |
| 3,197,558 | 6/1965 | Ernst | 178/6.6 B |
| 3,396,401 | 8/1968 | Nonomura | 178/6.6 B |
| 3,506,779 | 4/1970 | Brown | 178/6.6 B |
| 3,549,733 | 12/1970 | Caddell | 178/6.6 B |
| 3,636,251 | 1/1972 | Daly | 178/6.6 B |
| 3,679,818 | 7/1972 | Courtney-Pratt | 178/6.6 B |

FOREIGN PATENT DOCUMENTS 878,474  9/1961  United Kingdom .............. 178/6.6 B

*Primary Examiner*—Robert S. Tupper
*Assistant Examiner*—Alan Faber
*Attorney, Agent, or Firm*—Stevens, Davis, Miller & Mosher

[57] ABSTRACT

An electronic engraving system is provided wherein an object, e.g., a person, for a picture to be engraved on a card is picked up by a television camera and converted into corresponding electric signals; the electric signals are stored first and then read out at a lower scanning speed that suits a mechanical scanning system through scanning conversion means, and the picture of the object is engraved on the material in accordance with the read out signals, whereby the picture corresponding to the object can be easily engraved on the material, e.g., a plastic card without using any photographic original picture of the object.

7 Claims, 16 Drawing Figures

ELECTRONIC ENGRAVING SYSTEM

This application is a continuation-in-part of application Ser. No. 360,050, filed May 14, 1973, now abandoned.

The present invention relates to picture engraving systems and more particularly to an electronic engraving system wherein an object, e.g., an image of a person is converted into corresponding electric signals and the picture of the person is then engraved on the base plate of a card, e.g., a hard plastic material in accordance with the electric signals.

Heretofore, various methods have been attempted to identify the user of an identification card, such as, a credit card, ID card, bank card, cash dispenser card, oil card, key card, consulation ticket, communication ticket or license card. For instance, in one of the heretofore used methods, a photographic print of the face or the like of a user is affixed onto the base plate of a card, while in another method a photographic print of the face or the like of a user is utilized as an original to produce a printing plate which is used to print a picture of the user, e.g., his face on the base plate of a card.

However, these methods have been disadvantageous. For example, the method of affixing a photographic picture of a user's face is unsatisfactory from the standpoint of preventing possible forgery, that is, if the card is stolen or lost, the card may be used illicitly by replacing, for example, the picture on the card, thus frequently causing unexpected losses to the true user of the card. While, in this case, a film of plastic material may be coated on that portion of the card where a photographic picture of the user's face or the like is to be affixed in order to prevent the illicit replacement of the photograph, this results in an additional manufacturing process and hence an increase in the manufacturing cost of the card. A further drawback of this method of affixing a vignette is that the thickness of the card is increased as much as the thickness of the photograph so that if, for example, the card is magnetically verified by a machine or the like, an inconvenience frequently occurs in the mechanical handling of the card. On the other hand, the latter printing method has a drawback in that an individual printing plate must be made for producing only a single card and hence the cost for manufacturing such a card increases considerably. Either of these methods has a further drawback in that a photographic picture or a printed picture of a user's face manifested on the card base plate is inferior in durability and therefor it tends to be worn away during a prolonged use of the card, thereby losing its identifying function and making it difficult to certify the identity of the user during the term of validity of the card.

It is therefore an object of the present invention to provide an efficient electronic engraving system which has no need to prepare a photographic original picture of an object, e.g., a person.

According to the system of this invention a pickup unit, such as, a television camera is located at an image pickup position for a person who is an object of a picture to be engraved on a card, and electric signals corresponding to the picture picked up by the pickup unit are stored first in a signal storage and readout unit, whereby the picture to be engraved is cut on the surface of a card in accordance with the stored picture signals to thereby produce in an extremely simple manner a highly durable card contaning the picture of a person constituting an object.

In accordance with the present invention, there is thus provided an electronic engraving system comprising pickup means for converting an object into corresponding electric signals, signal storage and readout means for storing the electric signals from the pickup means and reading out the stored electric signals in accordance with command signals, and engraving means for engraving a picture to be engraved on a base material in accordance with the read out electric signals.

Other objects, features and advantages of the present invention will become apparent from the following detailed description taken in conjunction with the accompanying drawings, in which.

Figure 3:
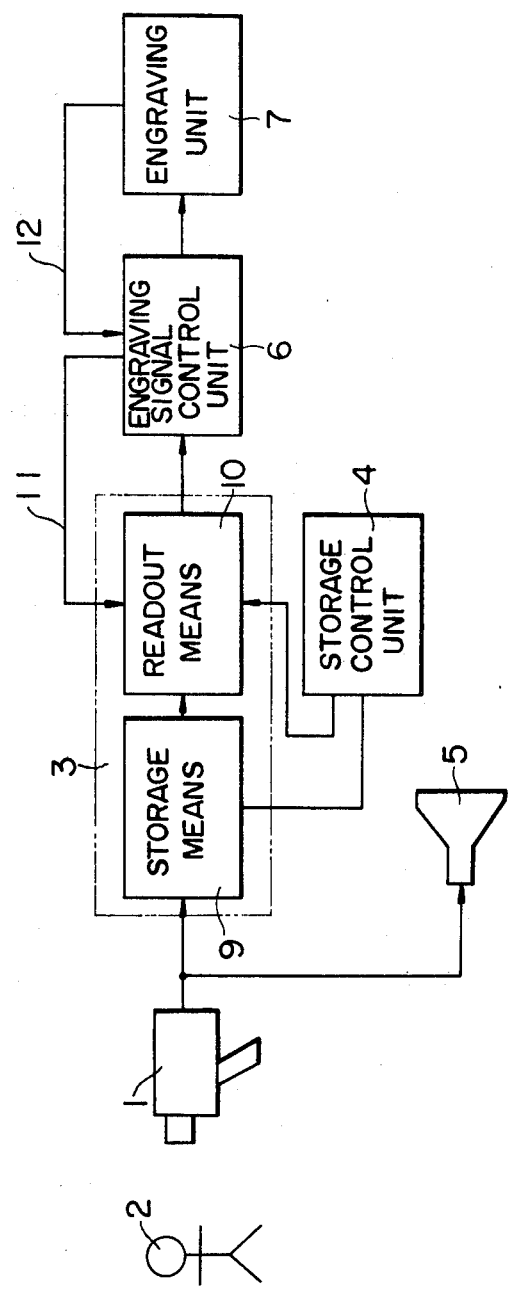
FIG. 3 is a block diagram of an electronic engraving system according to an embodiment of the present invention.
Figure 9:
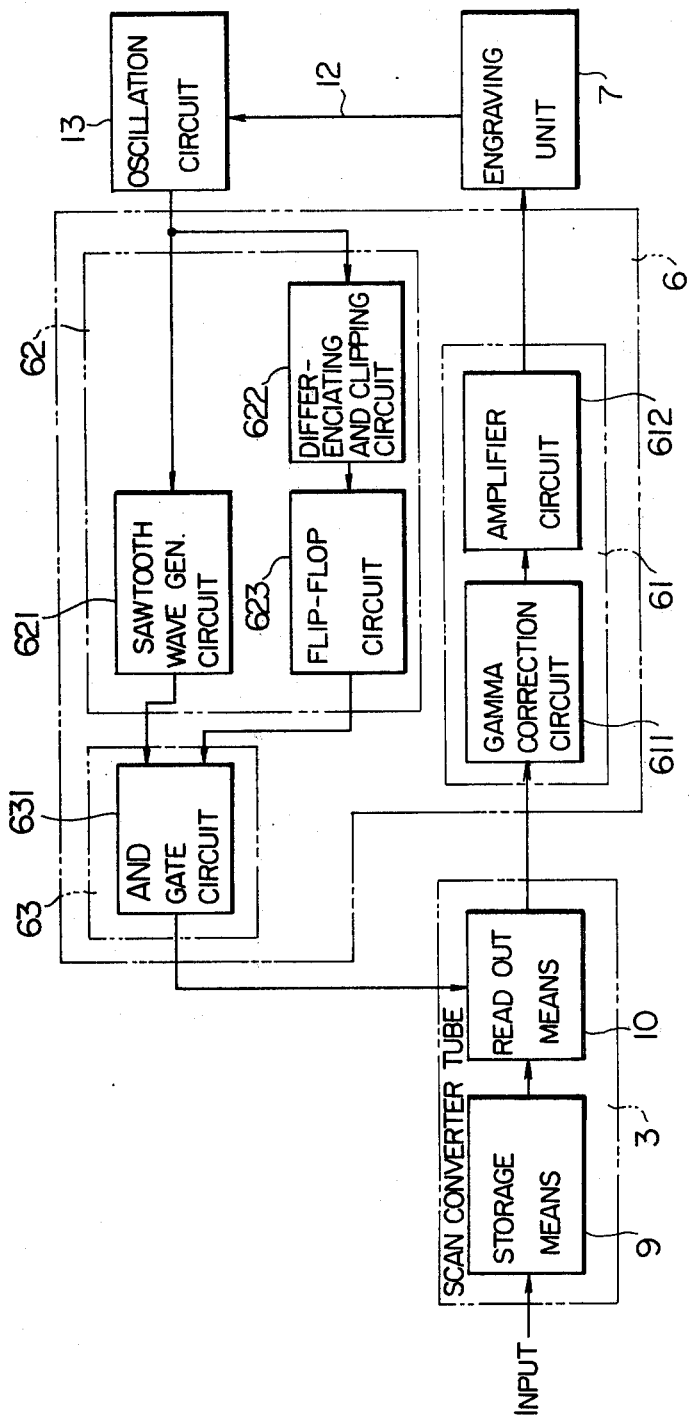
FIG. 9 is a detailed block diagram of a part of FIG. 3 wherein a scan converter tube is employed as a signal storage and readout means.
Figure 10:
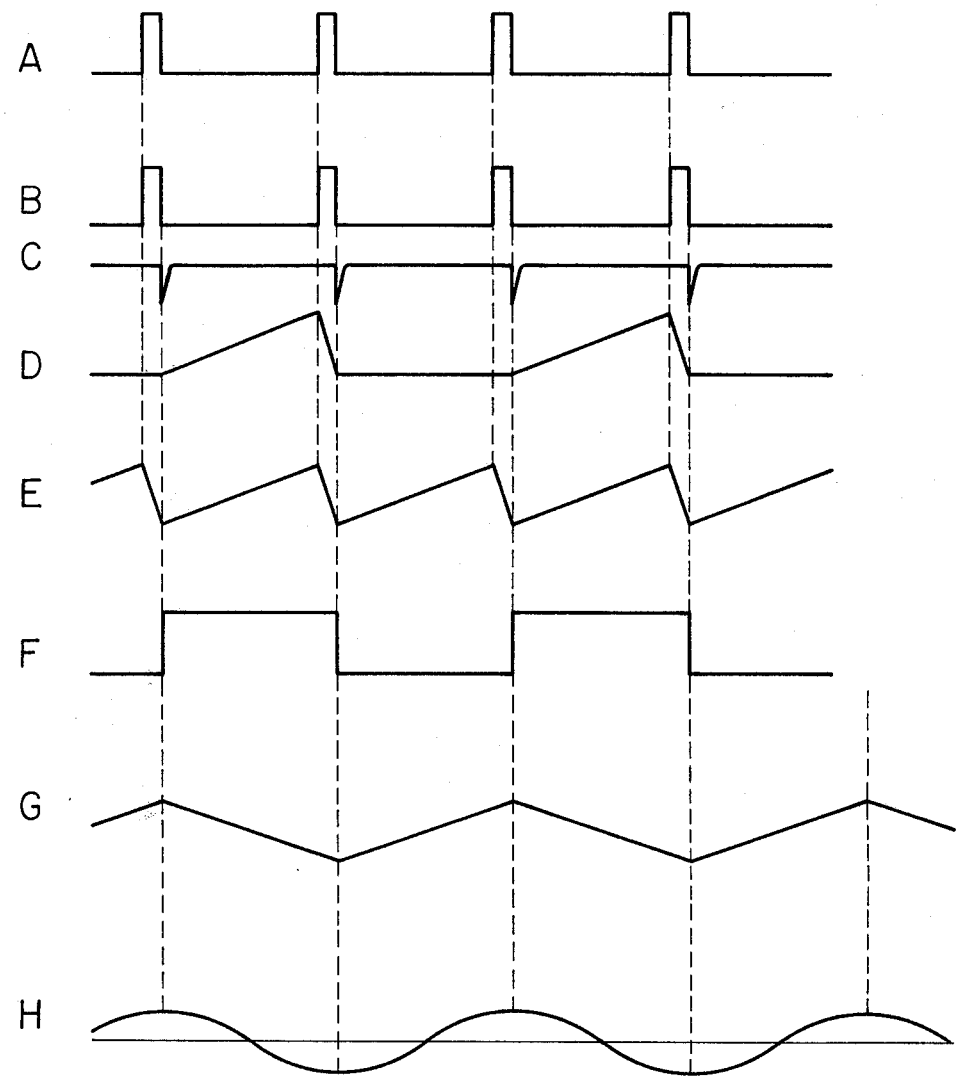
Figure 11:
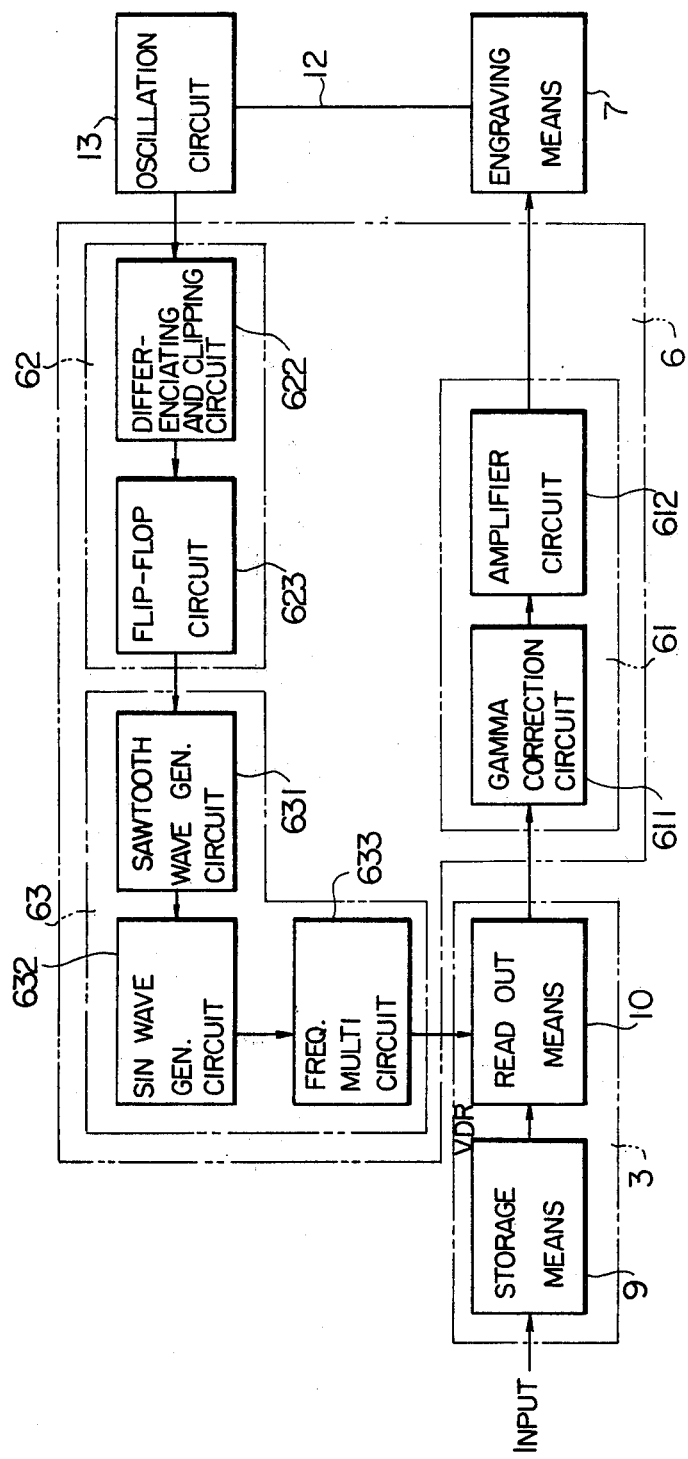
Figure 12:
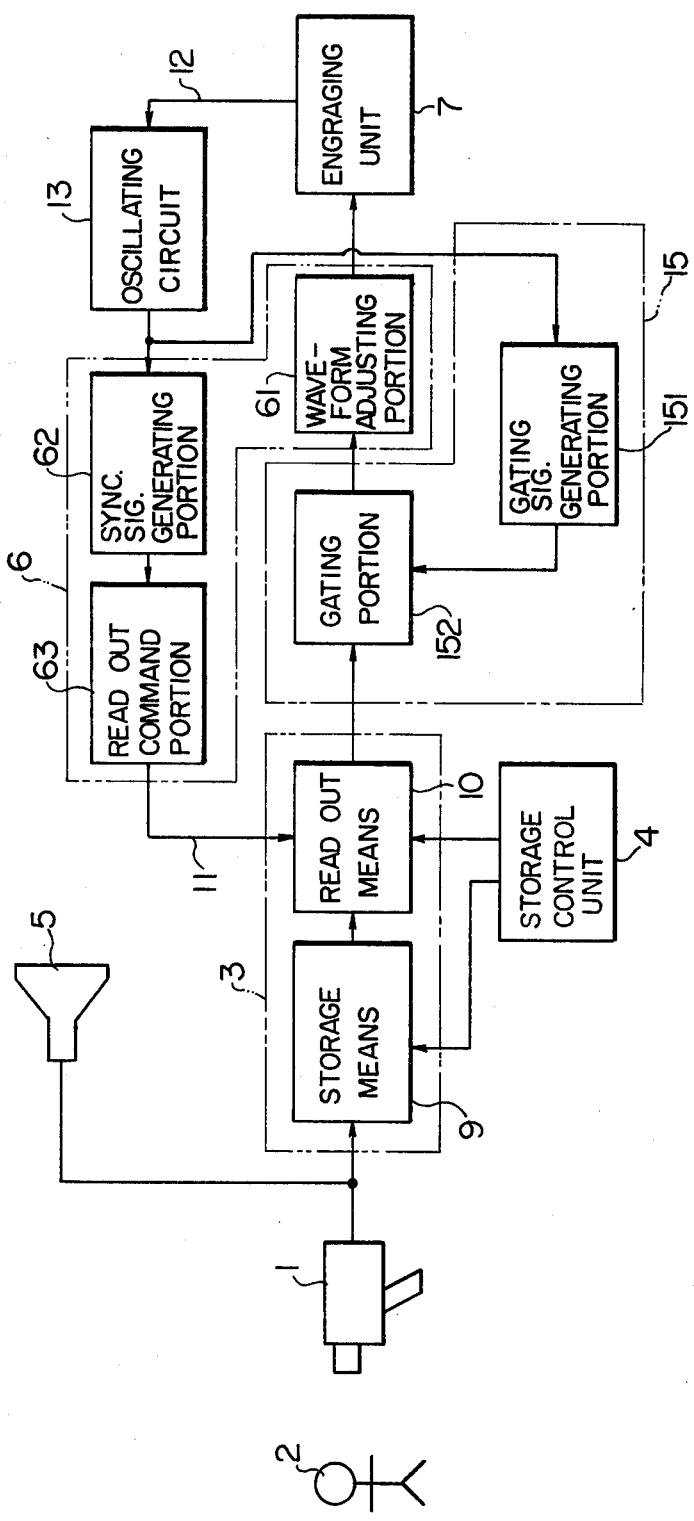
Figure 13:
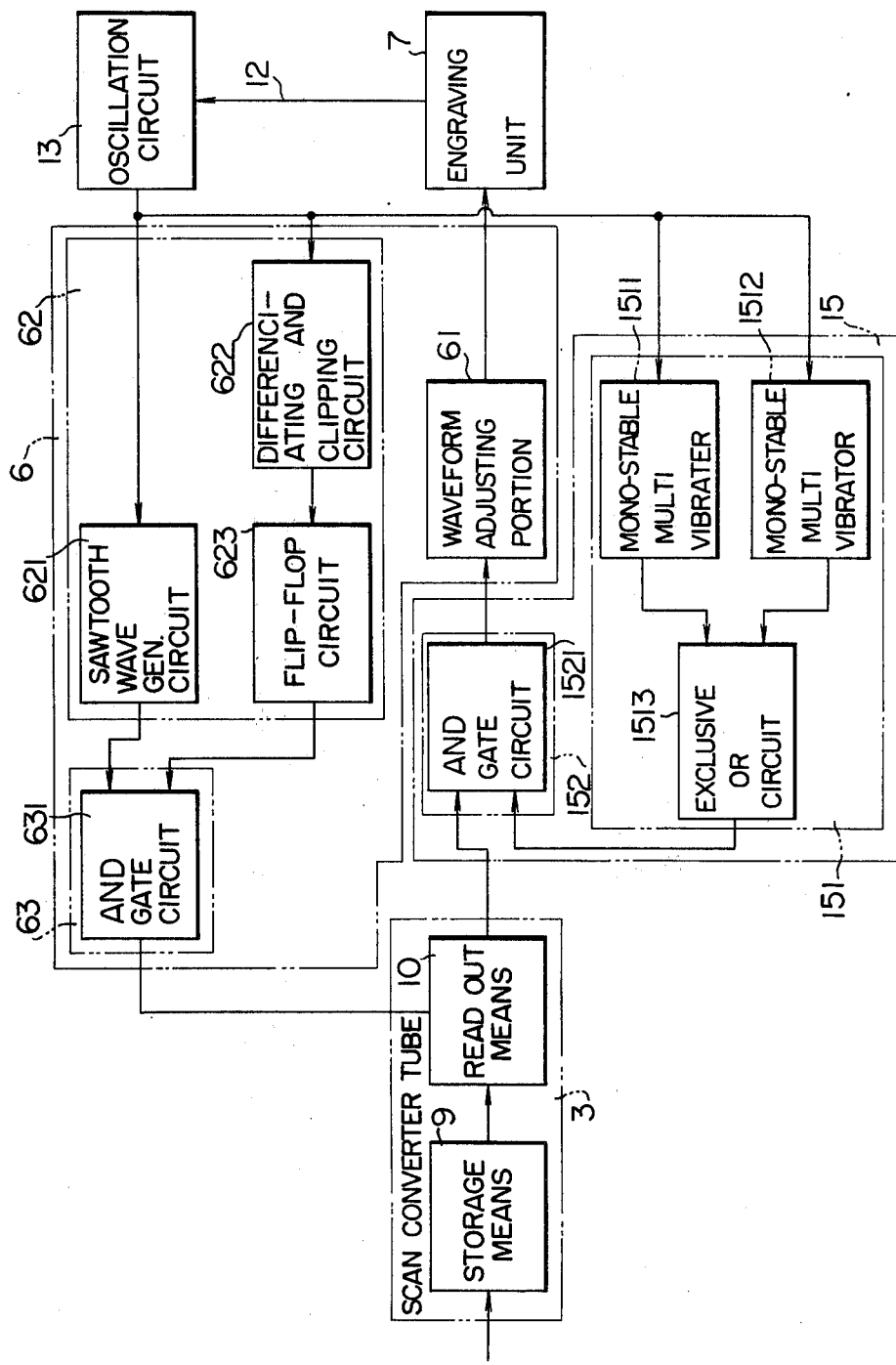
Figure 14:
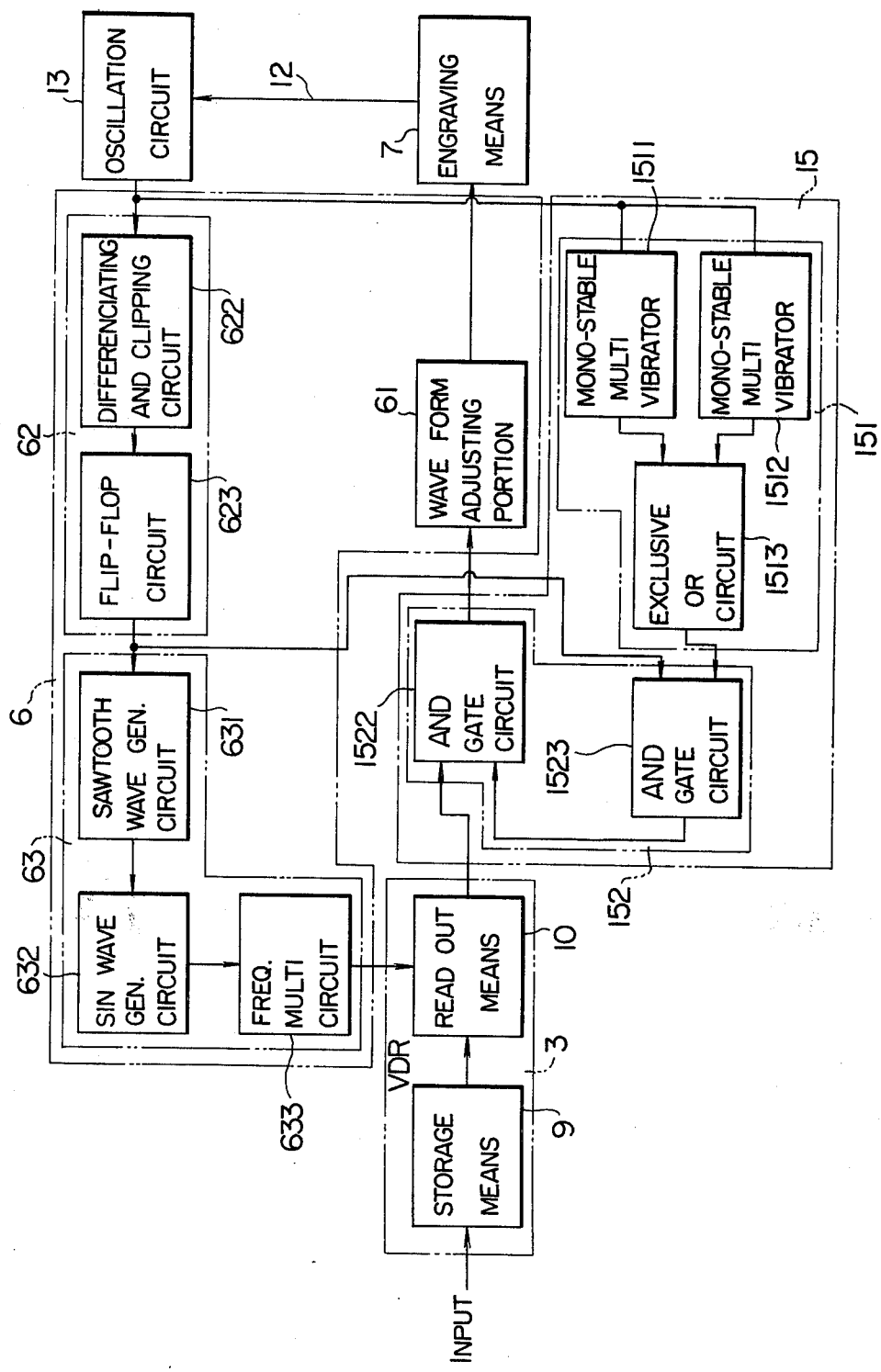
Figure 15:
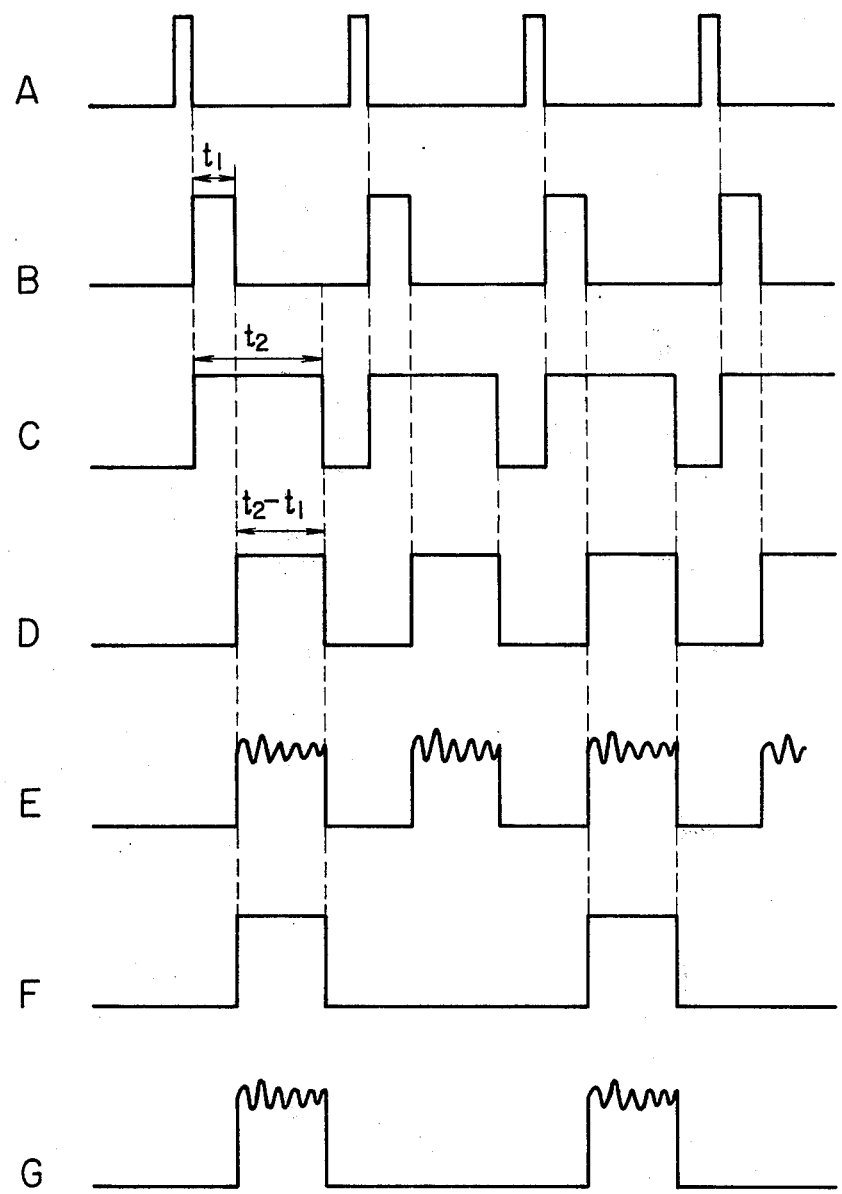
Figure 16:
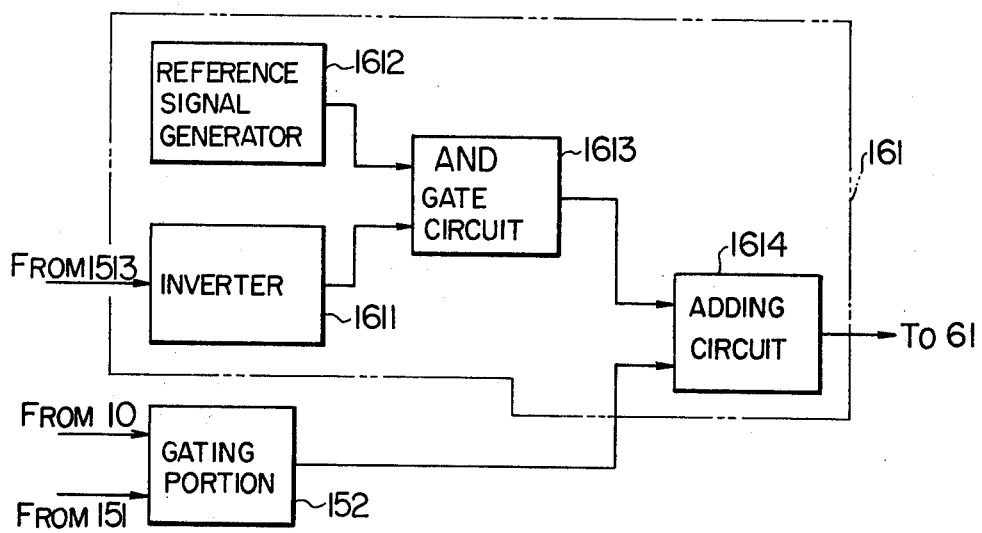

FIG. 10, including FIGS. A through H, shows waveforms for explaining the operation of circuit arrangements of FIGS. 9 and 11;

FIG. 11 is a detailed block diagram of a part of FIG. 3 wherein a video disc recorder is employed as a signal storage and readout means;

FIG. 12 is a block diagram of the electronic engraving system of another embodiment according to the present invention;

FIG. 13 is a detailed block diagram of a part of FIG. 12 wherein a scan converter tube is employed as a signal storage and readout means;

FIG. 14 is a detailed block diagram of a part of FIG. 12 wherein a video disc recorder is employed as a signal storage and readout means;

FIG. 15 including FIGS. A through G, shows waveforms for explaining the operation of FIGS. 13 and 14; and FIG. 16 is a block diagram of a part of an improvement of the embodiments as shown in FIGS. 13 and 14.

The invention will now be explained in greater detail with reference to the accompanying drawings.

Figure 1:
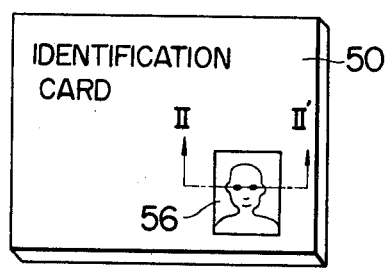
FIG. 1 is a front view of a card having an engraved picture.
Figure 2:
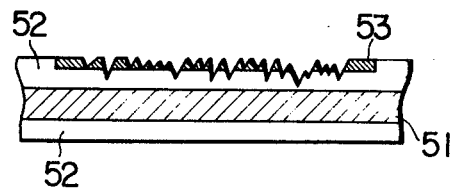
FIG. 2 is a sectional view taken along the line II—II' of FIG. 1.

FIGS. 1 and 2 illustrate a plastic card plate which is well suited for use as a base material on which a picture is to be engraved. In this card plate, the necessary items, e.g., the name, age, address etc., of a user of a card are printed on the surface of a white synthetic resin sheet 51, and a protective layer 52 of a transparent hard synthetic resin is placed on each side of the sheet 51. Also a colored area or layer 53 is provided which includes an area 56 having a bluish color or black, gray or brown color and adapted to manifest a portrait of the user. Then, an engraving picture 56, e.g., a picture of the user of the card, such as, his face is engraved on this card base plate by means of an engraving unit which, in accordance with electric signals corresponding to an object to be engraved, cuts within the aforesaid colored area fine linear or dotted grooved slots or holes of varying depth. These slots or holes are several tens of microns at the maximum, whereby a difference in the luster and shade of color is produced according to the ratio of the remaining area of the colored layer 53 to the exposed area of the white layer 51.

For example, by cutting fine linear or dotted grooves with a picture element density of 5 lines/mm and controlling the depth of the groove to be cut, the remaining area of the colored layer 53 is controlled. In other words, the cutting tool of a carving device is shaped like a cone or pyramid so that if the depth of a groove to be cut is made greater, the area of the colored layer 53 to be cut is made greater and hence its remaining area is reduced and the exposed area of the white layer 51 is increased. Thus, the groove which is produced visually appears to be whitish. On the contrary, if the depth of a groove to be cut is made shallow, the area of the colored layer 53 to be cut is made smaller so that the remaining area of the colored layer 53 is increased and the exposed area of the white layer 51 is reduced. Thus, the groove which is produced visually appears blackish. By controlling, in this way, the depth of a groove to be cut which corresponds to each picture element, a picture is obtained in which the respective small portions of the entire picture represent the lights and darks of the picture ranging from white to black. Further, while, in FIG. 2, the transparent protective layer 52 is provided on the surface of the white synthetic resin sheet 51 and the colored layer 53 is provided in a portion of the protective layer 52, the purpose of this protective layer 52 is to prevent deterioration of the picture quality of an engraved picture which may occur when the white synthetic resin sheet 51 consists of a soft material and therefore there is no need to use the protective layers 52 if the white synthetic resin sheet 51 consists of a sufficiently hard material. In the latter case, the colored layer 53 may be provided directly in a portion of the surface of the white layer 51.

Referring now to FIG. 3, numeral 1 designates a pickup unit, e.g., a television camera for converting an object 2, e.g., a human figure 2 into corresponding electric signals, and numeral 3 designates a signal storage and readout unit consisting of a storage means 9 for storing the electric signals from the pickup unit 1 and readout means 10 for reading out the stored electric signals. The unit 3 may, for example, be a scan converter tube, signal storage tube, video disc recorder (hereinafter referred to as a VDR), video sheet recorder (hereinafter referred to as VSR), video tape recorder (hereinafter referred to as a VTR) or digital memory including an A-D converter. The signal storage and readout unit 3 is provided because the engraving speed of an engraving unit 7 is extremely slow as compared with the image pickup speed of the pickup unit 1 so that picture signals produced by the pickup unit 1 are first stored in the storage means 9 and the stored picture signals are then read out by the readout means 10 in accordance with the engraving speed of the engraving unit 7. Numeral 4 designates a storage control unit for automatically or manually controlling the storage and reading of signals from the storage and readout unit 3.

Figure 4:
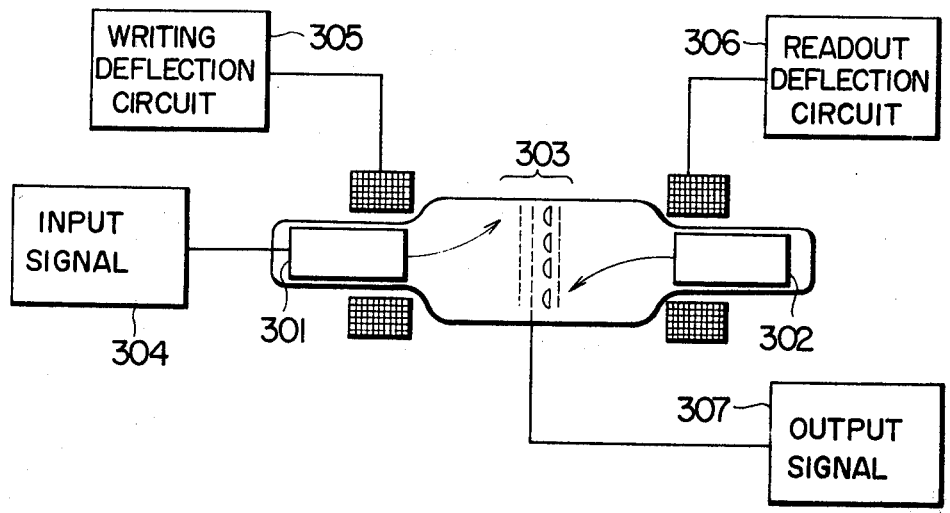
FIGS. 4 and 5 are block diagrams of scan converter tubes suitable for use with the system according to the invention.

The scan converter tube will now be explained as an example of the signal storage and readout unit 3. FIG. 4 shows one form of the scan converter tube. This storage tube comprises two electron guns, e.g., a writing electron gun 301 constituting a storage means and a reading electron gun 302 constituting a readout means, and a storage target section 303. Numeral 304 designates an input signal (write-in signal) from the pickup unit 1, 305 a writing deflection circuit, 306 a readout deflection circuit, and 307 an output signal (read-out signal). The input signal from the pickup unit 1 is applied to the writing electron gun 301 so that the electron beam from the electron gun 301 is modulated according to the picture signal and is also deflected by a signal from the writing deflection circuit 305, thereby storing the picture signal on the storage target section 303. The target section 303 having the picture signals stored thereon is scanned by the electron beam of a fixed beam current from the reading electron gun 302 and thus the stored picture signal is read out and delivered as an output signal 307. Since, in this case, the scanning speed of the writing deflection circuit can be made to differ from that of the reading deflection circuit, a difference in scanning speed between the input signal system and the output signal system can be provided. In other words, this scan converter tube is adapted to provide a scanning conversion between signal systems having different scanning speeds.

Figure 5:
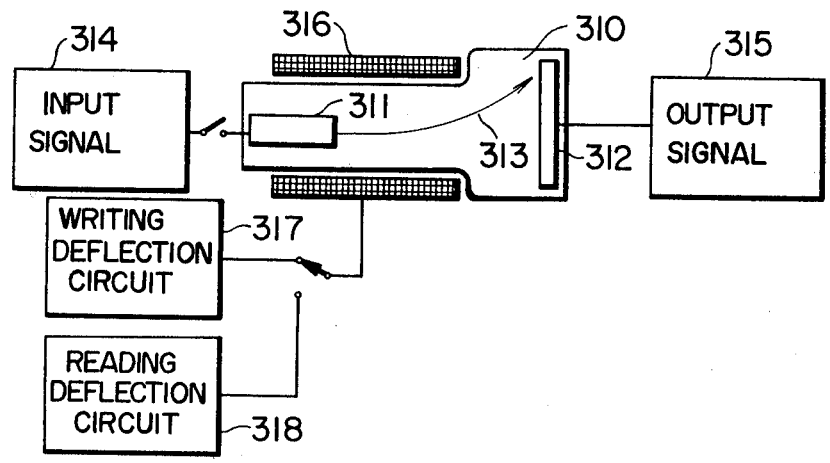

While the scan converter tube shown in FIG. 4 consists of a two-electron gun type storage tube, the scan converter tube is not necessarily limited to the two-electron gun type and the tube of a type having a single electron gun as shown in FIG. 5 may of course be employed. In FIG. 5, numeral 310 designates a storage tube, 311 an electron gun, 312 a semiconductor storage target consisting, for example, of a silicon semiconductor partially covered with an oxide coating, 313 an electron beam, 314 an input signal from the pickup unit 1, 315 an output signal, 316 a deflection system, 317 a writing deflection circuit, and 318 a reading deflection circuit. While this type of storage tube uses a single electron gun, the writing deflection circuit and the reading deflection circuit are selectively switched on and off to change the scanning speed and to thereby effect the desired scanning conversion. It is needless to say that no signal is applied to the electron gun during the reading operation.

Now referring back to FIGS. 3 and 7, numeral 5 designates a video monitor consisting of an ordinary television CRT for monitoring the object picked up by the television camera 1. Numeral 6 designates an engraving signal control unit for actuating the engraving unit 7 with the picture signals from the pickup unit 1. The control unit 6 controls the reading speed or the reading sequence of signals when the picture signals stored in the storage means 9 are read out by the readout means 10 in accordance with the speed at which the card is to be engraved. Furthermore, the control unit 6 adjusts the read out signals for adapting to the engraving unit 7. In other words, the engraving signal control unit 6 essentially comprises a synchronizing pulse generating portion which is controlled by signals 12 produced in response to the movement of the engraving unit 7 to synchronize the mechanical scanning of the engraving unit 7 with the reading scanning for reading out the picture signals, a readout command portion for commanding the reading of the stored picture signals with the synchronizing pulses, and a portion for adjusting the waveform of the readout signals to the waveform adapted to the engraving unit 7.

Figure 6:
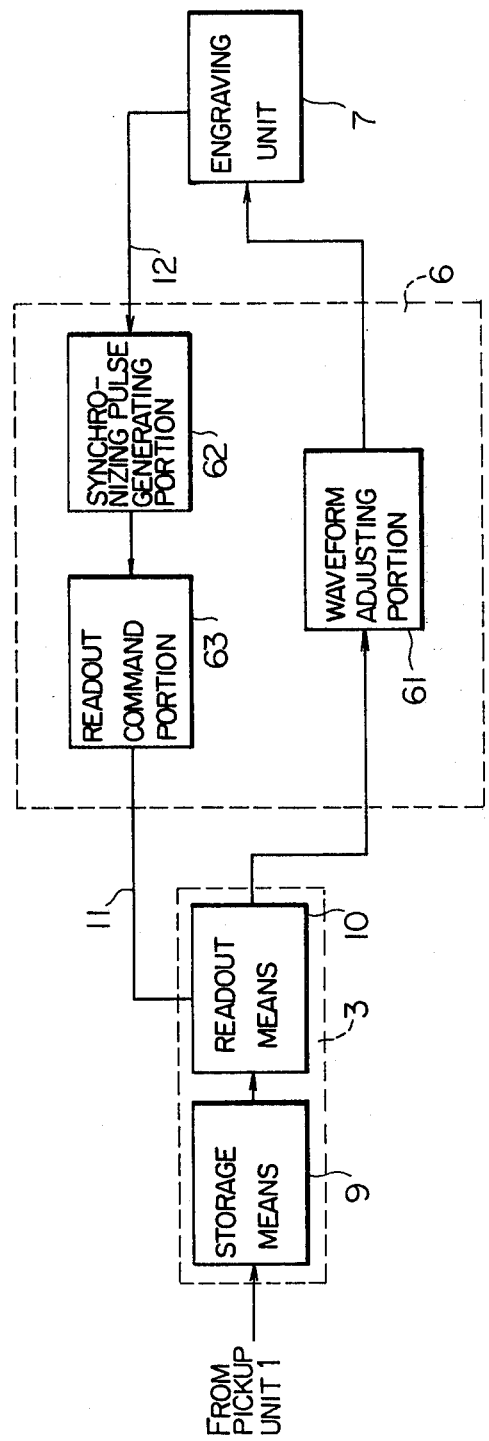
FIG. 6 is a detailed block diagram of a part of FIG. 3, in particular an engraving signal control unit.

The above description is easily illustrated as the FIG. 6, which shows the connection of the three essential portions of the engraving signal control unit 6 in connection with the storage and readout unit 3 and the engraving unit 7. The read out signal from the readout means 10 is supplied to the waveform adjusting portion 61 for adjusting or shaping the waveform of the read out signals to a waveform adapted to the engraving unit 7. Since it is possible to use the read out signal as an input signal to the engraving unit 7 after amplification of the read out signal, the waveform adjusting portion 61 may comprise an amplifying circuit. However, it is apparent that a gamma correction circuit known in the art may be employed additionally to correct the non-linearity of the read out signal and to make the input signal have a linear characteristic, if necessary.

If the read out signal from the signal storage and readout unit 3 is a digital signal, it is also apparent that the waveform adjusting portion 61 comprises a D-A converter. The output signal of the waveform adjusting portion 61 is supplied to the engraving unit 7 and drives it.

The synchronizing pulse generating portion 62 and the readout command portion 63 controls the reading speed or the reading sequence of the signals when the picture signals stored in the storage means 9 are read out by the readout means 10.

The function of the synchronizing pulse generating portion 62 to be performed is to generate a synchronizing pulse under the control of the signals 12 produced in response to the movement of the engraving unit 7 to synchronize the mechanical scanning of the engraving unit 7 with the reading scanning for reading out the picture signals as described previously. While, the readout command portion 63 is provided for commanding the reading of the stored picture signals with the synchronizing pulses. In other words, the readout command portion 63 produces a readout command signal 11 to drive the readout means 10 with the synchronizing pulse signal generated by the synchronizing pulse generating portion 62.

Figure 7:
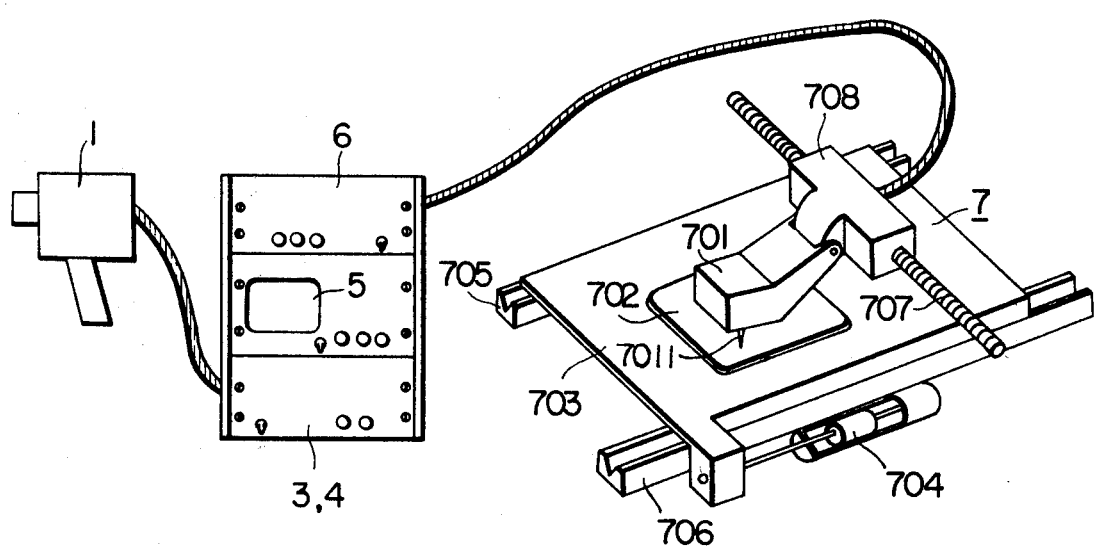
FIG. 7 is a perspective view of the system according to the invention, particularly showing the engraving unit in an enlarged form.
Figure 8:
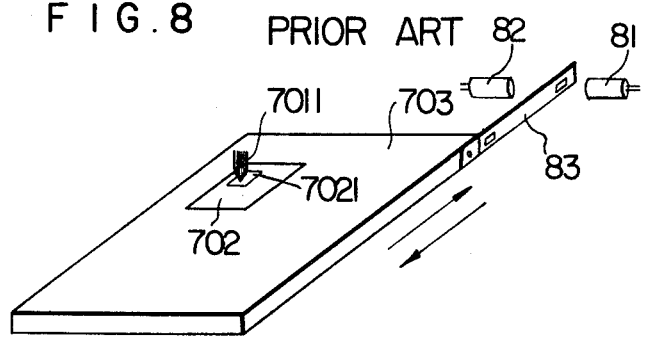
FIG. 8 is a perspective view of a synchronizing signal generating mechanism for the engraving unit employed in the system of this invention.

Numeral 7 designates the engraving unit a part of which is also shown in FIG. 7. The engraving unit may be of a similar construction as a prior art device such as the "VARIO-KLISHGRAPH" (Registered Trade Mark) manufactured by Hell Company in West Germany, or the AUTO-GRAVER (not registered) of Dainippon Screen Manufacturing Co., Ltd., in Japan. In FIG. 7, numeral 701 designates an engraving head having an engraving style 7011 adapted for vertical movement and arranged to face an engraving table 703 on which a card base plate 702 is placed. The engraving table 703 is reciprocated by a hydraulic cylinder 704 from side to side on rails 705 and 706 and upon completion of each stroke, i.e., each reciprocal motion, the engraving head 701 is displaced one pitch transversely with respect to the direction of movement of the engraving table 703 by a nut 708 threadedley mounted on a guide screw 707. The signals corresponding to the pciture produced from the object 2 and stored in the signal storage and readout unit 3, e.g., the scan converter tube are read out by the read instructions from the engraving signal control unit 6. In this case, the scanning speed of the reading deflection circuit is such that the reading is effected at a very low scanning speed to synchronize with the mechanical speed provided by the hydraulic cylinder 704 and the guide screw 707 of the engraving unit 7. Therefore, the engraving unit 7 is provided with means for generating synchronizing signals. For example, as shown in FIG. 8, the engraving table 703 is provided with an opaque substance 83 having two slits therein and it is arranged in parallel with the direction of movement of the engraving table. The distance between the two slits may be selected to be equal to the width of a colored area 702 provided in the card base plate 702 disposed on the engraving table 703.

On both sides of the opaque substance 83, a light emitting diode 81 and a photodiode 82, for example, are arranged at stationary positions opposite to each other.

As the engraving table 703 reciprocates, the light form the light emitting diode 81 is received by the photodiode 82 through the slits of the opaque substance 83, and thus two pulse signals are generated for every reciprocal movement of the engraving table 703. While, in this case, the opaque substance 83 with two slits is moved along with the engraving table 703 and the light emitting diode 81 and the photodiode 82 are fixed, it may be possible that the opaque substance 83 is fixed and the light emitting diode 81 and the photodiode 82 are moved along with the engraving table. These pulse signal are applied to the synchronizing pulse generating portion 62 of the engraving signal control unit 6 as the signals 12 from the engraving unit 7 directly or through an oscillation circuit, if necessary, which adjusts the waveform of the signals 12 in synchronism with the signals 12. The oscillation circuit as mentioned above is similar to the horizontal or vertical oscillation circuit of the horizontal or vertical deflection circuit in conventional television receivers. In the engraving signal control unit 6, the applied signals 12 produces a single sawtooth wave or a pulse having a width equal to the pulse interval between the two pulse signals 12 and this sawtooth wave is used as a signal 11 for reading out the picture signal stored in the signal storage and readout unit 3. In this way, in synchronism with the scanning speed of the engraving unit 7, the picture signals are read out from the signal storage and readout unit 3 and are applied to the engraving unit 7.

If a digital memory is employed as the signal storage and readout unit 3, the opaque substance 83 disposed between the photodiode 82 and the light emitting diode 81 is provided with as many slits as there are picture elements in one side of the picture to be engraved, whereby the pulse signals produced by the photodiode 82 receiving the light through these slits are used as the signals for sequentially reading out the picture signals stored in the digital memory.

While, in the case shown in FIGS. 7 and 8, the engraving style 7011 of the engraving unit 7 has been described as being of a stationary structure relative to the reciprocating movement of the card base plate 702 and moved vertically according to the picture signals to thereby engrave the card base plate and produce a picture thereon, the card base plate may be fixed and the engraving style of the engraving unit may be made to move vertically while making a reciprocating movement. In this case, the light emitting diode and the photodiode must be moved in unison with the engraving style.

The operation of the system according to the present invention will now be explained. When a picture of the object 2 is taken, the television camera 1 is operated while watching the picture on the video monitor 5 consisting of an ordinary television cathoe ray tube, thereby adjusting the extent of a picture to be engraved, the position of the picture, contrast, focus and so on. When the look of the picture to be picked up is established, the push button of the storage control unit 4 is depressed so that electric signals corresponding to the picture are written and stored in the signal storage and readout unit 3, e.g., a scan converter tube through the electron gun at a high scanning speed corresponding to the televised image. As a result, the electric signals corresponding to the picture are stored on the storage target of the scan converter tube. Since the picture of the object produced on the video monitor 5 at the instant when the image pickup push button of the storage control unit 4 is depressed, is picked up and stored and hence the picture is engraved on the card plate, the best engraving picture can be stored by watching the picture on the video monitor 5 and moreover the engraving picture can be retaken many times until a desirable picture is obtained. The electric signals thus stored can be retained for several days or alternately they can be erased at any time.

Thereafter, the engraving signal control unit 6 produces, in accordance with the synchronizing signals or other control signals 12 supplied from the engraving unit 7, the signals 11 which control the reading speed or reading sequence of the signals from the signal storage and readout unit 3, whereby the picture signals stored in the signal storage and readout unit 3 are read out and applied to the engraving unit 7 through the waveform adjusting portion 61 of the engraving signal control unit 6. The signals corresponding to the lights and darks of the object picture and produced from the signal storage and readout unit 3 are converted through a suitable operational amplifier circuit as the waveform adjusting portion 61 in the engraving signal control unit 6 into the vertical movements of the engraving head 701. The depth of grooves cut by the engraving style 7011 in the colored layer formed in the card base plate is controlled in accordance with the vertical movements of the engraving head 701. Since the engraving style is provided with a point shaped like a pyramid or cone, the area of cut of a groove increases as the groove is cut deeper and hence the remaining area of the colored layer in the card base plate decreases. In other words, the deeply cut groove represents a highlight portion of the picture. On the contrary, if the groove is cut shallow, the area of the groove is reduced and hence the remaining area of the colored layer increases and the resultant groove represents a shadow portion of the picture.

FIG. 9 illustrates a typical embodiment of the engraving signal control unit 6 where scan converter tube shown in FIGS. 4 or 5 is used as the storage and readout unit 3. The waveform adjusting portion 61 comprises a gamma correction circuit 611 and amplifier circuit 612. While, the synchronizing pulse generating portion 62 comprises a sawtooth wave signal generating circuit 621 actuated by the signals 12 from the engraving unit through an oscillation circuit 13, differenciating and clipping circuit 622 for differenciating and clipping the signals from the oscillation circuit 13, and a flip-flop circuit 623 driven by the output of the differenciating and clipping circuit 622. The readout command portion 63 comprises an AND gate circuit 631 to the input of which the output signals of the sawtooth wave generating circuit 621 and the flip-flop circuit 623 are applied.

The oscillation circuit 13 generates pulses in synchronism with the pulse 12 supplied to it from the engraving unit 7. The generated pulses are supplied to the sawtooth wave generating circuit 621 to generates a sawtooth wave signal. If the pulse 12 supplied to the oscillation circuit 13 is that as shown in FIG. 10-A, the oscillation circuit 13 oscillates the pulses as shown in FIG. 10-B and the sawtooth wave generating circuit 621 generates sawtooth wave signal as shown in FIG. 10-E. The output of the oscillation circuit 13 is also supplied to the differenciating and clipping circuit, whereby a pulse train shown in FIG. 10-C is obtained. The pulse train triggers the flip-flop circuit 623 and produces a rectangular wave as shown in FIG. 10-F.

The sawtooth wave from the sawtooth wave generating circuit 621 and the rectangular wave from the flip-flop circuit 623 are applied to the AND gate circuit, as a result, a sawtooth wave signal as shown in FIG. 10-D is obtained as an output signal 11 of the engraving signal control unit 6.

The sawtooth wave signal from the AND gate circuit 631 is applied to the readout means, namely, to the readout deflection circuit 306 of the scan converter tube shown in FIG. 4 or reading deflection circuit 318 of the scan converter tube shown in FIG. 5.

FIG. 11 illustrates a typical embodiment of the engraving signal control unit 6 when a VDR is used as the storage and readout unit 3.

The VDR per se is known in the art and the techniques of controlling the recording and reading out are also known, for example, in U.S. Pat. No. 3,775,568. According to the known techniques relating to VDRs having a high speed driving motor and a low speed driving motor, it is possible to record a video signal from a pickup tube by rotating the turn table at a high speed and to readout the recorded signal at a low rotational speed of the turn table. According to this technique, it is apparently possible to control the low speed driving motor for reading out to rotate at various low speeds in synchronization with the operation of the engraving unit 7.

In this case, the synchronizing pulse generating portion 62 may be comprised of a rectangular wave generating circuit, and the rectangular wave generating circuit may generate a rectangular wave having a pulse width equal to the interval between two pulse signals 12. As the rectangular wave above mentioned, the signal in FIG. 10-F which is already mentioned is applicable. Therefore, the rectangular wave generating circuit may consist of a differenciating and clipping circuit, and Flip-Flop circuit. The synchronizing pulse generating portion 62 is driven by the oscillation circuit 13 as is the case where a scan converter tube is used in FIG. 9. However, the oscillation circuit 13 is not necessary, if the pulse 12 is used instead of the output of the oscillation circuit 13 as is the case where a scan converter tube is used as a signal storage and readout unit 3.

The readout command portion 63 produces a readout command signal 11 to drive the readout means 10. In this case, however, the readout command signal 11 is apparently applied to the low speed driving motor of the VDR thereby to control the speed of the driving motor. The speed of the driving motor can be controlled, as is known, by varying the frequency or the voltage of the power supply. As a result, it is apparent that the readout command portion 63 may be comprised of a sinusoidal wave generating means to produce a signal having a frequency corresponding to the number of rectangular wave signals produced by the synchronizing pulse generating portion 62, or a frequency-voltage converting circuit to produce a signal having a voltage corresponding to the number of rectangular wave signals produced by the synchronizing pulse generating portion 62.

In FIG. 11, sinusoidal wave generating means is employed. That is to say, the sinusoidal wave generating means as the readout command portion comprises a sawtooth wave generating circuit 631, sinusoidal wave generating circuit 632 and a frequency multiplier circuit 633.

The operation of the circuit arrangement shown in FIG. 11 is as follows.

The signal from the readout means 10 is supplied to the engraving unit 7 through the gamma correction circuit 611 and the amplifier circuit 612. This is the same operation as that of the case in FIG. 9, therefore detailed description is neglected herein. The signal 12 from the engraving unit 7 triggers the oscillation circuit 13 and it produces a pulse signal in synchronism with the signal 12. If the signal 12 is that as shown in FIG. 10-A, the pulse signal from the oscillation circuit 13 is that shown in FIG. 10-B. The pulse signal from the oscillation circuit 13 is supplied to the differentiating and clipping circuit 622 and it produces a signal as shown in FIG. 10-C. The signal from the differenciating and clipping circuit triggers the flip-flop circuit 623 to produce a rectangular wave signal as shown in FIG. 10-F.

The rectangular wave signal is converted into a triangular wave signal by the sawtooth wave generating circuit 631. The triangular wave signal is shown in FIG. 10-G. Next, the triangular wave signal is converted into a sinusoidal wave signal as shown in FIG. 10-H by the sinusoidal wave generating circuit 632. The sinusoidal wave generating circuit 632 is well known, for example, as shown in "Sourcebook of Electronic Circuits," McGraw-Hill, Inc., 1968, pp 542. The sinusoidal wave signal is multiplied in frequency by the frequency multiplier circuit 633 and supplied to the readout means 10, that is to say, the low speed driving motor of the VDR. As a result, the low speed driving motor rotates in synchronism with a harmonic of the signal 12 from the engraving unit 7, whereby the VDR reads out the stored picture signal at a speed adapted to the reciprocation of the engraving table 703 of the engraving unit 7.

When the rotational speed of the low speed driving motor is to be controlled by the voltage supplied thereto, the readout command portion 63 comprises a frequency-voltage converter. The frequency voltage converter is well known, for example, on page 146 of the "Sourcebook of Electronic Circuits" (previously mentioned).

FIG. 12 shows another embodiment of the invention. This embodiment has a trimming means 15 additionally to the embodiment shown in FIGS. 3 or 6. The trimming means 15 picks out a part of signal from the output signal of the readout means 10. The trimming means 15 comprises a gating signal generating portion 151 and a gating means 152. Gating signal generating portion 151 is actuated by the signal from the oscillation circuit 13 or the signal 12 from the engraving unit 7, and it produces a gating signal having a period corresponding to the period of the picture signal to be picked out. The obtained gating signal gates the read out signal at the gating portion and the output of which is supplied to the waveform adjusting portion.

Detailed circuit embodiment of the trimming means 15 is illustrated in FIGS. 13 and 14. FIG. 13 illustrates a block diagram in the case where the scan converter tube is used as the storage and read-out unit 3. The gating signal generating portion 151 comprises two mono-stable multivibrators 1511, 1512 and an exclusive OR circuit 1513, and the gating portion 152 comprises an AND gate circuit.

The output of the oscillation circuit 13 is further supplied to the mono-stable multivibrators 1511 and 1512. These multivibrators have different time constants with each other. Namely, the mono-stable multivibrator 1511 has a short time constant $t_1$ and the other mono-stable multi-vibrator 1512 has a long time constant $t_2$. The difference $t_2-t_1$ corresponds to the period of the signals to be picked out. The outputs of the mono-stable multivibrators 1511 and 1512 are supplied to the exclusive OR circuit, whereby the exclusive OR circuit produces an output of a pulse having a period of $t_2-t_1$. The waveforms of the oscillation circuit 13, mono-stable multivibrators 1511, 1512 and exclusive OR circuit 1513 are shown in FIG. 15, A to D respectively.

The output pulse of the exclusive OR circuit 1513 is supplied to the AND gate circuit 1521 with the picture signals from the readout means, whereby the AND gate circuit 1521 produces a picked out picture signal as shown in FIG. 15-E. This picture signal is adjusted in waveform by the waveform adjusting portion and is supplied to the engraving unit 7.

FIG. 14 illustrates a block diagram in the case where a VDR is used as the storage and readout unit 3. The gating signal generating portion 151 is the same as that of the case in FIG. 13. Whereas, the gating portion comprises two AND gate circuits 1522 and 1523. One of the AND gate circuits 1523 is supplied with the output signal from the exclusive OR circuit 1513 and the flip-flop circuit 623, and thus the AND gate circuit 1523 produces the rectangular wave pulse as shown in FIG. 15-F. The output of the AND gate circuit 1523 is applied to another AND gate circuit 1522 with the picture signals from the read-out means 10, whereby the AND gate circuits 1522 produces a picked out picture signal as shown in FIG. 15-G. This picture signal is adjusted in waveform by the waveform adjusting portion and is supplied to the engraving unit 7.

In FIGS. 13 or 14, if the engraved picture on the card has unengraved colored portion corresponding to the thrown away signals by the trimming means 15 at the periphery of the card, a circuit 161 as shown in FIG. 16 may be added. The circuit 161 comprises an inverter 1611, a reference signal generator 1612 which produces a signal corresponding to white level signal, an AND gate circuit 1613, and adding circuit 1614. The inverter 1611 inverts the signal from the exclusive OR circuit 1513 and supplies to the AND gate circuit 1613 which is also supplied with the white level signal from the reference signal generator 1612. As a result, the AND gate circuit 1613 produces a white level signal having a period corresponding to the thrown away signals by the trimming means 15. This signal is added with the output of the gating portion by adding circuit 1614 and supplied to the engraving unit 7 through waveform adjusting portion 61, whereby the engraved picture on the card has not unengraved colored portion at the periphery of the card.

There is the optimum value for the cutting speed of the picture which is dependent on the mechanical resonance characteristic of the engraving style, and the time required for engraving an area on the order of 25 millimeters square ranges from 30 seconds to 3 minutes.

Therefore, if the object 2 is a person, it is difficult for the person as the object to remain still during such a period in contrast to a case where a photographic original of the person in employed. Thus, it has been utterly impossible with prior art systems to use a person as a direct original object for engraving purposes.

The foregoing difficulty has been overcome by the present invention and moreover the present invention has made it unnecessary to use a recording medium such as a photographic printing paper heretofore used with conventional systems and has provided a means for inexpensively and very simply manifesting a picture of a human face, character, pattern or the like on a card base plate.

Further, there is a method in which a bistable type storage tube is employed so that its storage target having information stored therein is scanned in a predetermined sequence with a high speed pulse-type reading electron beam and the output signals produced on the storage target electrode are applied to recording means in response to the reading electron beam of the bistable type storage tube. However, while, in this method, the desired synchronism between the reading electron beam scanning and the scanning of the recording means in the bistable type storage tube can be obtained by electric signals such as voltage pulses if the scanning of the recording means is as high as that of the reading electron beam, it is difficult to obtain the desired synchronism between the two scannings if the recording means uses a low velocity scanning as in the case of a cutting engraving process. To the contrary, according to the present invention, the signal storage and readout unit used comprises a scan converter tube with writing and reading speeds which are different from each other, so that the picture signals produced by the high speed scanning system such as a television camera are stored first and the scanning speed is converted to a low velocity scanning synchronized with a low scanning speed of the mechanical scanning system. In this way, a picture picked up by a television camera or the like can be directly engraved on a card base plate through a simple circuitry.

While, in the embodiments described hereinbefore, the signal storage and readout unit for effecting the desired scanning conversion has been composed of a scan conversion tube, other means such as a VDR may also be employed. Although the VDR is a magnetic recording disc which is rotated at a high speed for writing during a high speed writing operation and at a low speed for reading during a low speed reading operation, it is possible to effect the desired scanning conversion by rotating the disc at a high speed for sampling reading purposes during a low speed reading operation. Furthermore, there is no need to mention that the signal storage and readout unit is not limited to the scan converter tube and VDR and that any other devices that can provide the desired scanning conversion between the input and the output may also be employed.

What is claimed is:

1. An electronic engraving system comprising:
   an image pickup means for generating electric signals corresponding to an object;
   a signal storage and readout means of the scanning conversion type for storing said electric signals from said image pickup means at a high speed and reading out said stored electric signals at a low speed corresponding to an engraving speed in accordance with command signals;
   an engraving means for engraving a picture of the object on a material in response to said read out electric signals, said engraving means including an engraving head having an engraving style arranged to face an engraving table, means for reciprocating said engraving table or engraving style and means for shifting said engraving style transversely to the direction of the reciprocation of said engraving table or engraving style; and
   a command signal producing means for producing said command signals, said command signal producing means including a pulse producing means for producing pulses in response to the reciprocation of said engraving table or engraving style and a synchronizing pulse generating circuit for generating a synchronizing pulse in response to said pulses produced by said pulse producing means.

2. An electronic engraving system according to claim 1, wherein said material comprises a hard plastic plate having a colored area on which said picture is engraved.

3. An electronic engraving system according to claim 1, wherein said signal storage and readout means is a scan conversion tube.

4. An electronic engraving system according to claim 1, wherein said signal storage and readout means is a magnetic disc recorder.

5. An electronic engraving system according to claim 1, wherein said pulse producing means comprises an opaque substance having two slits coupled to said engraving table, a light emitting device disposed on one side of said opaque substance, a light receiving device disposed on the other side of said opaque substance opposite to said light emitting device.

6. An electronic engraving system according to claim 1, further comprising a trimming means for picking out signals from the output signals of said signal storage and readout means.

7. An electronic engraving system comprising:
   an image pickup means for generating electric signals corresponding to an object;
   a signal storage and readout means of the scanning conversion type for storing said electric signals from said image pickup means at a high speed and reading out said stored electric signals at a low speed corresponding to an engraving speed in accordance with command signals;
   an engraving means for engraving a picture of the object on a material in response to said read out electric signals, said engraving means including an engraving head having an engraving style arranged to face an engraving table, means for reciprocating said engraving style and means for shifting said engraving style transversely to the direction of the reciprocation of said engraving style; and
   a command signal producing means for producing said command signals, said command signal producing means including a pulse producing means for producing pulses in response to the reciprocation of said engraving style and a synchronizing pulse generating circuit for generating a synchronizing pulse in response to said pulses produced by said pulse producing means.

* * * * *